US012682744B2

(12) United States Patent (10) Patent No.: US 12,682,744 B2
Yamaura et al. (45) Date of Patent: Jul. 14, 2026

(54) TRAFFIC CONGESTION DETECTION SYSTEM

(71) Applicant: TOYOTA JIDOSHA KABUSHIKI KAISHA, Toyota (JP)

(72) Inventors: Yusuke Yamaura, Meguro-ku (JP); Tatsuya Sonobe, Shinagawa-ku (JP); Yasumasa Kobayashi, Edogawa-ku (JP); Shintaro Fukushima, Bunkyo-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 18/613,272

(22) Filed: Mar. 22, 2024

(65) Prior Publication Data

US 2024/0395134 A1 Nov. 28, 2024

(30) Foreign Application Priority Data

May 22, 2023 (JP) ................................. 2023-083861

(51) Int. Cl.
*G08G 1/01* (2006.01)
*G06V 20/58* (2022.01)

(52) U.S. Cl.
CPC ........... *G08G 1/0133* (2013.01); *G06V 20/58* (2022.01); *G08G 1/0112* (2013.01);
(Continued)

(58) Field of Classification Search
None
See application file for complete search history.

(56) References Cited

U.S. PATENT DOCUMENTS

2014/0270536 A1* 9/2014 Amtrup .................. G06V 30/40
382/195
2019/0258878 A1* 8/2019 Koivisto ................. G01S 7/417
(Continued)

FOREIGN PATENT DOCUMENTS

JP 2008-286633 A 11/2008
JP 2020004235 A * 1/2020
(Continued)

OTHER PUBLICATIONS

Traffic condition determination system and traffic condition determination device (Year: 2020).*

*Primary Examiner* — Abby J Flynn
*Assistant Examiner* — Bakari Underwood
(74) *Attorney, Agent, or Firm* — Finnegan, Henderson, Farabow, Garrett and Dunner, LLP

(57) ABSTRACT

A traffic congestion detection system including a server device, the server device includes at least one processor, the at least one processor being configured to perform commands: acquiring pieces of traveling data from a plurality of vehicles; generating first traffic congestion detection information based on at least part of the acquired pieces of traveling data; acquiring image information on a surrounding image for at least one vehicle out of the plurality of vehicles; determining whether to use the image information for traffic congestion detection based on a confidence level related to the first traffic congestion detection information; generating second traffic congestion detection information by using the acquired image information when the determining the image information is to be used for the traffic congestion detection; and generating third traffic congestion detection information based on the second traffic congestion detection information.

8 Claims, 6 Drawing Sheets

(52) U.S. Cl.
CPC ......... *G08G 1/0141* (2013.01); *G08G 1/0145*
(2013.01); *G06V 2201/08* (2022.01)

(56) References Cited

U.S. PATENT DOCUMENTS

2022/0351618 A1\*  11/2022  Zhou .................... G06V 20/582
2023/0410644 A1    12/2023  Hayashi et al.

FOREIGN PATENT DOCUMENTS

| | | |
|---|---|---|
| JP | 2021-051423 A | 4/2021 |
| JP | 2022-152560 A | 10/2022 |
| WO | WO 2022/107193 A1 | 5/2022 |

\* cited by examiner

FIG. 1
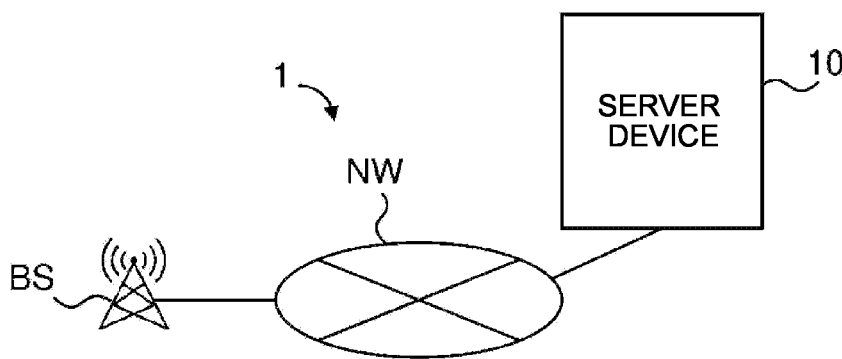
   

| 11 | COMPUTATION DEVICE |
|----|----|
| 111 | TRAVELING DATA ACQUISITION UNIT |
| 112 | TRAVELING DATA TRAFFIC CONGESTION DETECTION UNIT |
| 113 | DETERMINATION UNIT |
| 114 | VEHICLE SELECTION UNIT |
| 115 | IMAGE SPECIFICATION CHANGE UNIT |
| 116 | IMAGE DATA ACQUISITION UNIT |
| 117 | IMAGE DATA TRAFFIC CONGESTION DETECTION UNIT |
| 118 | TRAFFIC CONGESTION INFORMATION INTEGRATION UNIT |

STORAGE DEVICE — 12

TRAVELING DATA — 121

IMAGE DATA — 122

COMMUNICATION DEVICE — 13

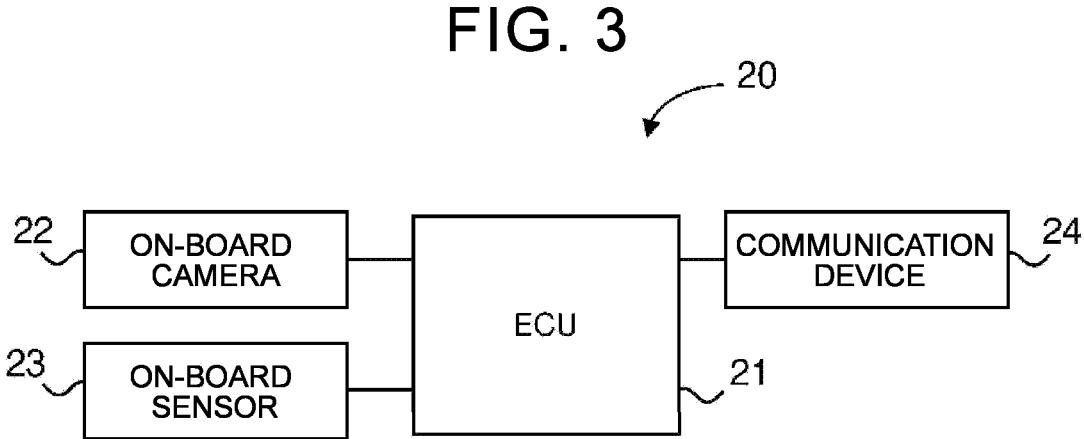

22  ON-BOARD CAMERA

23  ON-BOARD SENSOR

ECU

COMMUNICATION DEVICE  24

21

TRAFFIC CONGESTION DETECTION SYSTEM

CROSS-REFERENCE TO RELATED APPLICATION

This application claims priority to Japanese Patent Application No. 2023-083861 filed on May 22, 2023, incorporated herein by reference in its entirety.

BACKGROUND

1. Technical Field

The present disclosure relates to a technical field of a traffic congestion detection system.

2. Description of Related Art

As this type of system, there has been proposed, for example, a system in which, when traffic congestion is detected by a traffic congestion detection unit mounted on a vehicle, a traveling image is acquired from the vehicle traveling on a road where the traffic congestion is detected and a range of the traffic congestion is detected based on the traveling image (see Japanese Unexamined Patent Application Publication No. 2022-152560 (JP 2022-152560 A)).

SUMMARY

In the technology described in JP 2022-152560 A, image analysis is performed for all locations where traffic congestion is detected. Therefore, there is a technical problem of an increase in communication cost related to transmission and reception of images and analysis cost related to image analysis.

The present disclosure proposes a traffic congestion detection system in which at least one of communication cost and analysis cost can be reduced.

A traffic congestion detection system according to an aspect of the present disclosure includes: a server device, the server device includes at least one processor, the at least one processor being configured to perform commands: acquiring pieces of traveling data from a plurality of vehicles; generating first traffic congestion detection information based on at least part of the acquired pieces of traveling data; acquiring image information on a surrounding image for at least one vehicle out of the plurality of vehicles; determining whether to use the image information for traffic congestion detection based on a confidence level related to the first traffic congestion detection information; generating second traffic congestion detection information by using the acquired image information when the determining the image information is to be used for the traffic congestion detection; and generating third traffic congestion detection information based on the second traffic congestion detection information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 shows an overview of a traffic congestion detection system according to a first embodiment;

FIG. 2 is a block diagram showing a configuration of a server device according to the first embodiment;

FIG. 3 is a block diagram showing an example of a configuration of a vehicle according to the first embodiment;

DETAILED DESCRIPTION OF EMBODIMENTS

Figure 4:
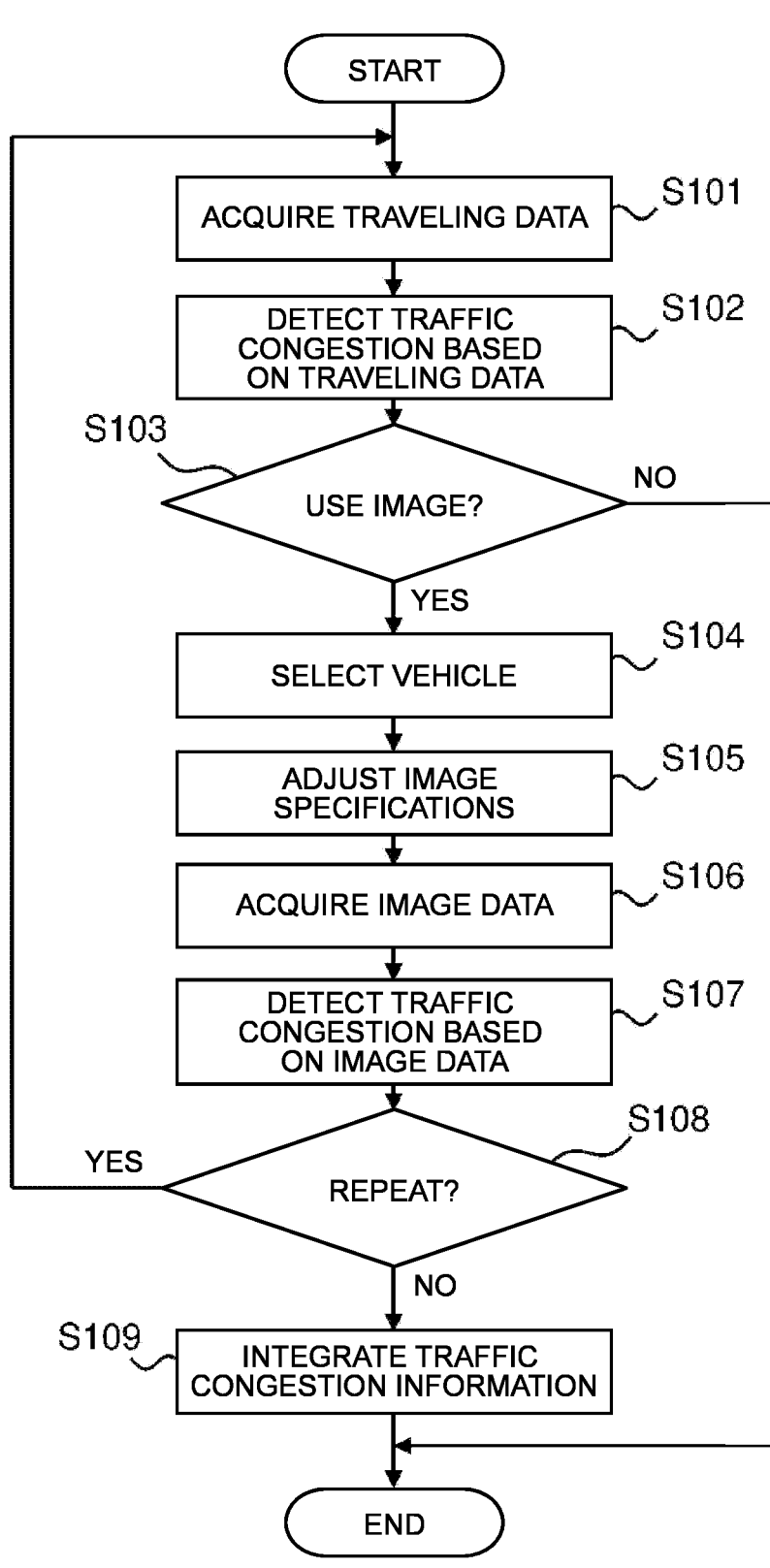
FIG. 4 is a flowchart showing an operation of the traffic congestion detection system according to the first embodiment.

Embodiments related to a traffic congestion detection system will be described with reference to the drawings.

First Embodiment

A first embodiment related to the traffic congestion detection system will be described with reference to FIGS. 1 to 11. In FIG. 1, a traffic congestion detection system 1 includes a server device 10. The traffic congestion detection system 1 may include one or more vehicles that can communicate with the server device 10 via a wireless base station BS and a network NW. The one or more vehicles may be so-called connected cars.

The server device 10 will be described with reference to FIG. 2. In FIG. 2, the server device 10 includes a computation device 11, a storage device 12, and a communication device 13.

The computation device 11 may include at least one of, for example, a central processing unit (CPU), a graphics processing unit (GPU), a field programmable gate array (FPGA), and a tensor processing unit (TPU).

The storage device 12 may include at least one of, for example, a random access memory (RAM), a read only memory (ROM), a hard disk drive, a magneto-optical disk drive, a solid state drive (SSD), and an optical disc array. That is, the storage device 12 may include a non-transitory recording medium.

The storage device 12 can store desired data. For example, the storage device 12 may temporarily store a computer program to be executed by the computation device 11. The storage device 12 may temporarily store data to be temporarily used by the computation device 11 when the computation device 11 is executing the computer program.

The communication device 13 may communicate with a device (e.g., a vehicle) external to the server device 10 via the network NW. The network NW may be a wide area network such as the Internet.

The computation device 11 may include a traveling data acquisition unit 111, a traveling data traffic congestion detection unit 112, a determination unit 113, a vehicle selection unit 114, an image specification change unit 115, an image data acquisition unit 116, an image data traffic congestion detection unit 117, and a traffic congestion information integration unit 118 as logically implemented functional blocks or physically implemented processing circuits.

At least one of the traveling data acquisition unit 111, the traveling data traffic congestion detection unit 112, the determination unit 113, the vehicle selection unit 114, the image specification change unit 115, the image data acquisition unit 116, the image data traffic congestion detection unit 117, and the traffic congestion information integration unit 118 may be implemented by a mixture of a logical functional block and a physical processing circuit (i.e., hardware).

In the case where at least part of the traveling data acquisition unit 111, the traveling data traffic congestion detection unit 112, the determination unit 113, the vehicle selection unit 114, the image specification change unit 115, the image data acquisition unit 116, the image data traffic congestion detection unit 117, and the traffic congestion information integration unit 118 is a functional block, the at least part of the traveling data acquisition unit 111, the traveling data traffic congestion detection unit 112, the determination unit 113, the vehicle selection unit 114, the image specification change unit 115, the image data acquisition unit 116, the image data traffic congestion detection unit 117, and the traffic congestion information integration unit 118 may be implemented by the computation device 11 executing a predetermined computer program. The computation device 11 may acquire the predetermined computer program from the storage device 12.

A vehicle 20 as an example of a vehicle that can communicate with the server device 10 will be described with reference to FIG. 3. In FIG. 3, the vehicle 20 includes an electronic control unit (ECU) 21, an on-board camera 22, an on-board sensor 23, and a communication device 24.

The on-board camera 22 is disposed in the vehicle 20 to capture images of the surroundings of the vehicle 20. For example, the on-board camera 22 may be disposed in a vehicle cabin of the vehicle 20 to capture an image of an area ahead of the vehicle 20 through a windshield of the vehicle 20. The on-board camera 22 may include two or more cameras. In this case, the on-board camera 22 may include at least two cameras out of a camera that can capture an image of an area ahead of the vehicle 20, a camera that can capture an image of an area behind the vehicle 20, and a camera that can capture an image of an area on the side of the vehicle 20.

The on-board sensor 23 detects the behavior of the vehicle 20. For example, the on-board sensor 23 may include a speed sensor, an acceleration sensor, a yaw rate sensor, a steering angle sensor, and a position detection sensor that detects the position of the vehicle 20.

The ECU 21 may transmit traveling data indicating the behavior of the vehicle 20 detected by the on-board sensor 23 to the server device 10 via the communication device 24. That is, the server device 10 may acquire the traveling data from the vehicle 20. The server device 10 may store the traveling data acquired from the vehicle 20 in the storage device 12 (see "traveling data 121" in FIG. 2). The traveling data acquired from the vehicle 20 that is a moving body may be referred to as "probe data". The traveling data may include position information indicating the position of the vehicle 20 and speed information indicating the speed of the vehicle 20. The traveling data 121 in FIG. 2 may include traveling data acquired from a vehicle different from the vehicle 20.

The ECU 21 may transmit a surrounding image showing the surroundings of the vehicle 20 and captured by the on-board camera 22 to the server device 10 via the communication device 24. That is, the server device 10 may acquire the surrounding image from the vehicle 20. The server device 10 may store the surrounding image acquired from the vehicle 20 in the storage device 12 (see "image data 122" in FIG. 2). The image data 122 in FIG. 2 may include a surrounding image acquired from a vehicle different from the vehicle 20.

An operation of the server device 10 will be described with reference to the flowchart of FIG. 4. In the first embodiment, each of the vehicles including the vehicle 20 may sequentially transmit pieces of traveling data to the server device 10. As a result, the pieces of traveling data of each of the vehicles including the vehicle 20 may sequentially be stored in the storage device 12 of the server device 10. Among the pieces of traveling data stored in the storage device 12, the server device 10 may delete traveling data for which a first predetermined time has elapsed since the server device 10 acquired the traveling data. Each of the vehicles including the vehicle 20 may sequentially transmit surrounding images to the server device 10. As a result, the surrounding images of each of the vehicles including the vehicle 20 may sequentially be stored in the storage device 12 of the server device 10. Among the surrounding images stored in the storage device 12, the server device 10 may delete a surrounding image for which a second predetermined time has elapsed since the server device 10 acquired the surrounding image. The second predetermined time may be different from or equal to the first predetermined time.

In FIG. 4, the traveling data acquisition unit 111 of the server device 10 acquires traveling data from the storage device 12 (step S101). For example, the traveling data acquisition unit 111 may acquire traveling data within a predetermined period from among the pieces of traveling data 121 stored in the storage device 12. For example, the traveling data acquisition unit 111 may acquire traveling data within a predetermined position range from among the pieces of traveling data 121 stored in the storage device 12. For example, the traveling data acquisition unit 111 may acquire traveling data within the predetermined period and within the predetermined position range from among the pieces of traveling data 121 stored in the storage device 12.

The traveling data traffic congestion detection unit 112 of the server device 10 detects traffic congestion based on at least part of the traveling data acquired in the process of step S101 (step S102). The traveling data traffic congestion detection unit 112 generates first traffic congestion information on the detected traffic congestion. Various known methods can be applied to the method for detecting traffic congestion based on traveling data. That is, the method for detecting traffic congestion based on traveling data may be selected as appropriate depending on, for example, the specifications of a product. The following method is an example of the method for detecting traffic congestion based on traveling data. The traveling data traffic congestion detection unit 112 may detect traffic congestion based on a temporal change in the position of a vehicle indicated by position information in the traveling data.

The determination unit 113 of the server device 10 determines whether to use an image for traffic congestion detection based on a confidence level related to the first traffic congestion information generated by the traveling data traffic congestion detection unit 112 (step S103). The determination unit 113 may determine to use an image for traffic congestion detection when the confidence level related to the first traffic congestion information is lower than a first threshold. In other words, the determination unit 113 may determine not to use an image for traffic congestion detection when the confidence level related to the first traffic congestion information is equal to or higher than the first threshold. A specific example of the confidence level related to the first traffic congestion information will be described later.

When determination is made, in the process of step S103, not to use an image for traffic congestion detection (step S103: No), the operation shown in FIG. 4 is terminated. In this case, the server device 10 may distribute traffic congestion information based on the first traffic congestion information to a plurality of vehicles including the vehicle 20 via the communication device 13.

When determination is made, in the process of step S103, to use an image for traffic congestion detection (step S103: Yes), the vehicle selection unit 114 of the server device 10 selects a vehicle serving as a provider of an image (e.g., a surrounding image) to be used for traffic congestion detection (step S104). For example, the vehicle selection unit 114 may select one or more vehicles traveling at a location of the traffic congestion indicated by the first traffic congestion information or near the location of the traffic congestion as the vehicle(s) serving as the provider of an image.

The image specification change unit 115 of the server device 10 adjusts (or changes) the specifications of the image to be used for traffic congestion detection based on the confidence level related to the first traffic congestion information (step S105). The process of step S105 may be performed in parallel with the process of step S104 or the order may be reversed. The specifications of the image may include at least one of an image size, an image resolution, and a video length. A specific example of the method for adjusting the specifications of the image based on the confidence level will be described later. For example, the image specification change unit 115 may reduce the resolution of an image in a case where the confidence level related to the first traffic congestion information is lower than but close to the first threshold compared to the resolution of an image in a case where the confidence level related to the first traffic congestion information is significantly lower than the first threshold.

The image data acquisition unit 116 of the server device 10 acquires image data (e.g., a surrounding image) from the storage device 12 (step S106). Specifically, the image data acquisition unit 116 acquires an image(s) acquired from the one or more vehicles selected by the vehicle selection unit 114 with the image specifications adjusted by the image specification change unit 115 from among the pieces of image data stored in the storage device 12.

The image data traffic congestion detection unit 117 of the server device 10 detects traffic congestion by using at least part of the image data acquired in the process of step S106 (step S107). The image data traffic congestion detection unit 117 generates second traffic congestion information on the detected traffic congestion. Various known methods can be applied to the method for detecting traffic congestion by using image data. That is, the method for detecting traffic congestion by using image data may be selected as appropriate depending on, for example, the specifications of a product.

The following method is an example of the method for detecting traffic congestion by using image data. The image data traffic congestion detection unit 117 may detect traffic congestion by performing predetermined image processing (e.g., at least one of object detection processing, tracking processing, and lane detection processing) on an image (e.g., a surrounding image). The image data traffic congestion detection unit 117 may detect traffic congestion by using a learning model that outputs a traffic congestion detection result when image data is input. Such a learning model may be constructed by deep learning that is one form of machine learning. The learning model constructed by deep learning may be a mathematical model constructed by machine learning using a multilayer neural network including a plurality of intermediate layers (that may also be referred to as "hidden layers"). The neural network may be, for example, a convolutional neural network.

The determination unit 113 determines whether to repeat the above process based on a confidence level related to the second traffic congestion information generated by the image data traffic congestion detection unit 117 (step S108). The determination unit 113 may determine to repeat the above process when the confidence level related to the second traffic congestion information is lower than a second threshold. In other words, the determination unit 113 may determine not to repeat the above process when the confidence level related to the second traffic congestion information is equal to or higher than the second threshold. A specific example of the confidence level related to the second traffic congestion information will be described later.

When determination is made, in the process of step S108, to repeat the above process (step S108: Yes), the process of step S101 is performed. When determination is made, in the process of step S108, not to repeat the above process (step S108: No), the traffic congestion information integration unit 118 of the server device 10 integrates the first traffic congestion information and the second traffic congestion information to generate integrated traffic congestion information (step S109). The server device 10 may distribute traffic congestion information based on the integrated traffic congestion information to a plurality of vehicles including the vehicle 20 via the communication device 13.

The traffic congestion information integration unit 118 may generate the integrated traffic congestion information by adding information indicated by the second traffic congestion information to information indicated by the first traffic congestion information. The traffic congestion information integration unit 118 may generate the integrated traffic congestion information by changing (in other words, replacing) at least part of the information indicated by the first traffic congestion information to the information indicated by the second traffic congestion information. The traffic congestion information integration unit 118 may generate the integrated traffic congestion information by correcting at least part of the information indicated by the first traffic congestion information based on the information indicated by the second traffic congestion information.

First Specific Example

As a first specific example of the operation of the traffic congestion detection system 1, an operation of detecting traffic congestion for each lane will be described with reference to FIGS. 5A to 8 in addition to the flowchart of FIG. 4.

In the process of step S101 of FIG. 4, the traveling data acquisition unit 111 of the server device 10 may acquire pieces of traveling data related to a plurality of vehicles traveling on a predetermined road within a predetermined period from the storage device 12. The predetermined road may be, for example, a road corresponding to one link in a road map expressed by combinations of nodes and links.

In the process of step S102 of FIG. 4, the traveling data traffic congestion detection unit 112 may determine a speed distribution based on pieces of speed information in the pieces of traveling data acquired by the traveling data acquisition unit 111. The traveling data traffic congestion detection unit 112 may assume that the number of distributions is "2" and perform fitting processing using a Gaussian mixture model on the determined speed distribution.

The number of distributions may change depending on the number of lanes on the road where vehicles traveling in one direction can pass. For example, when the number of lanes on the road where vehicles traveling in one direction can pass is "2" (so-called road with two lanes on each side), the number of distributions may be "2". For example, when the number of lanes on the road where vehicles traveling in one direction can pass is "3" (so-called road with three lanes on each side), the number of distributions may be "3". The initial value of the number of distributions may be set regardless of the number of lanes on the road where vehicles traveling in one direction can pass.

Figure 5A:
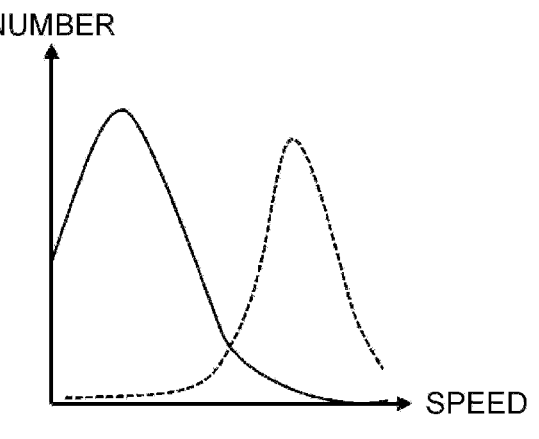
FIG. 5A shows an example of results of fitting processing.
Figure 5B:
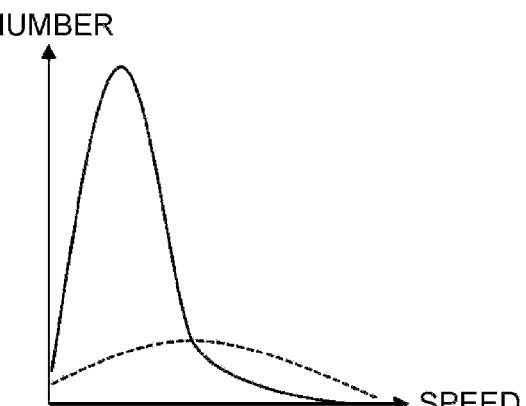
FIG. 5B shows an example of results of fitting processing.

For example, when traffic congestion occurs in one lane where vehicles traveling in one direction can pass and no traffic congestion occurs in another lane that is adjacent to the one lane and is a lane where vehicles traveling in one direction can pass, the speeds of vehicles traveling in the one lane are lower than the speeds of vehicles traveling in the other lane. When the fitting processing is performed in the process of step S102 in this case, for example, two peaks appear as shown in FIG. 5A. In FIGS. 5A and 5B, the "number" on the vertical axis may be read as "frequency".

For example, when traffic congestion occurs in both the one lane and the other lane, it is considered that there is little difference between the speeds of vehicles traveling in the one lane and the speeds of vehicles traveling in the other lane. When the fitting processing is performed in the process of step S102 in this case, for example, there is a strong possibility that only one peak appears as shown in FIG. 5B. For example, the results of the fitting processing shown in FIGS. 5A and 5B correspond to examples of the first traffic congestion information described above.

The traveling data traffic congestion detection unit 112 may calculate the confidence level (i.e., the confidence level related to the first traffic congestion information) based on the result of the fitting processing, etc. For example, the traveling data traffic congestion detection unit 112 may calculate the confidence level by using a mathematical expression "conf=w1×x1+w2×x2+w3×x3+ . . . +wn×xn". In the above mathematical expression, "conf" represents the confidence level, "w1, w2, w3, . . . , wn" represent weights, and "x1, x2, x3, . . . , xn" represent parameters.

The parameters may include at least one of, for example, (1) the number of vehicles, (2) the ratio of the number of vehicles in one lane to the number of vehicles in another lane, (3) a fitting score of the Gaussian mixture model, (4) a speed average of a low-speed side distribution among a plurality of distributions, and (5) a difference between average speeds of the distributions. The above mathematical expression is an example, and the confidence level may be calculated by a method different from the method using the above mathematical expression.

The inventors' research has revealed that, in the operation of detecting traffic congestion for each lane, the confidence level tends to decrease, for example, in at least one of the cases where (1) the number of vehicles traveling on a predetermined road is small or there is an imbalance in the numbers of vehicles in individual lanes, (2) the difference between an average speed in a lane where traffic congestion occurs and an average speed in a lane where no traffic congestion occurs is relatively small, (3) vehicles in a lane where traffic congestion occurs are moving at a certain speed (i.e., vehicles in a lane where traffic congestion occurs do not repeat start and stop), (4) traffic congestion is temporarily relieved in a lane where traffic congestion occurs, and (5) the number of lanes where vehicles traveling in one direction can pass is three or more.

When determination is made, in the process of step S103 of FIG. 4, to use an image for traffic congestion detection (step S103: Yes), the processes of step S104 and subsequent steps are performed. In the process of step S104, the vehicle selection unit 114 may select, for example, one vehicle traveling at a relatively high speed as the vehicle serving as the provider of an image from among a plurality of vehicles traveling on a predetermined road within a predetermined period.

The vehicle traveling at a relatively high speed travels a relatively long distance in a certain period (the speed is the amount of change in the position of the vehicle per unit time). Therefore, surrounding images (e.g., a video) captured by an on-board camera of the vehicle in that period have wider spatial coverage than surrounding images (e.g., a video) captured by an on-board camera of a vehicle traveling at a relatively low speed in that period. That is, in the certain period, the range of space imaged by the on-board camera of the vehicle traveling at a relatively high speed is wider than the range of space imaged by the on-board camera of the vehicle traveling at a relatively low speed. In other words, when imaging the same range of space, the amount of data on the surrounding images (e.g., the video) from the vehicle traveling at a relatively high speed is smaller than the amount of data on the surrounding images (e.g., the video) from the vehicle traveling at a relatively low speed. Therefore, the load of image processing on the image data traffic congestion detection unit 117 can be reduced by using the surrounding images from one vehicle traveling at a relatively high speed. For example, for this reason, the vehicle selection unit 114 may select one vehicle traveling at a relatively high speed from among the vehicles traveling on the predetermined road within the predetermined period.

In the process of step S104, the vehicle selection unit 114 may select, for example, one vehicle that is traveling at a relatively high speed and is present for a relatively long time on the predetermined road within the predetermined period from among the vehicles traveling on the predetermined road within the predetermined period. With this configuration, there is a strong possibility that the surrounding images (e.g., the video) from the one vehicle include a relatively large number of locations where traffic congestion occurs, and it is expected that the traffic congestion will be detected appropriately in the process of step S107 of FIG. 4.

In the process of step S105 of FIG. 4, the image specification change unit 115 adjusts (or changes) the specifications of the image to be used for traffic congestion detection based on the confidence level calculated by the traveling data traffic congestion detection unit 112 (i.e., the confidence level related to the first traffic congestion information). For example, the image specification change unit 115 may adjust the image specifications by using a mathematical expression "1=max(σ(conf)×1_max, 1_min)".

In the above mathematical expression, "1" represents a video length after adjustment, "conf" represents the confidence level, "1_max" represents a video length before adjustment, "1_min" represents the minimum value of the video length, and "σ" represents an activation function such as an identity function or a sigmoid function. Although the description has been given of the case where the image specification change unit 115 adjusts the video length, the image specification change unit 115 may adjust at least one of an image size and an image resolution in addition to or instead of the video length.

In the process of step S106 of FIG. 4, the image data acquisition unit 116 acquires an image acquired from the one vehicle selected by the vehicle selection unit 114 with the image specifications adjusted by the image specification change unit 115 from among the pieces of image data stored in the storage device 12.

In the process of step S107 of FIG. 4, the image data traffic congestion detection unit 117 detects traffic congestion by using at least part of the image data acquired by the image data acquisition unit 116. An example of the method for detecting traffic congestion by the image data traffic congestion detection unit 117 will be described with reference to FIGS. 6A to 8.

Figure 6A:
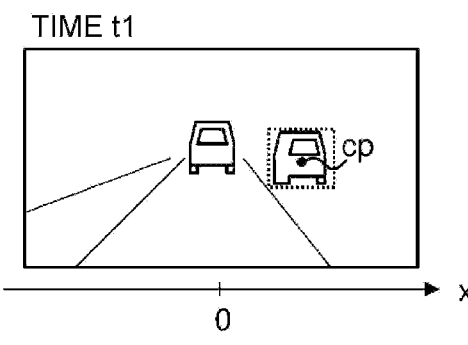
FIG. 6A shows an example of images captured by an on-board camera.
Figure 6B:
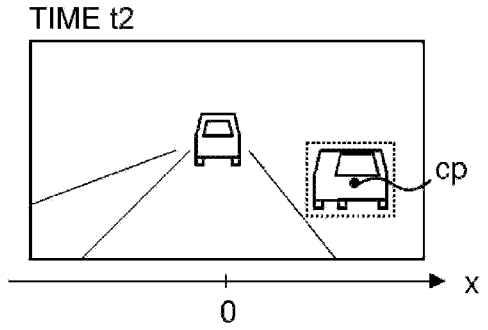
FIG. 6B shows an example of images captured by an on-board camera.
Figure 7:
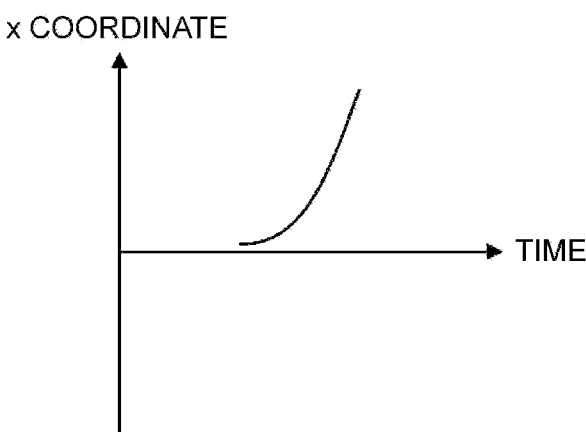
FIG. 7 shows an example of a temporal change in an x coordinate of a vehicle shown in an image.

FIG. 6A shows an example of an image captured by the on-board camera at time t1. FIG. 6B shows an example of an image captured by the on-board camera at time t2 later than time t1. It is assumed that a first vehicle including the on-board camera that has captured the images shown in FIGS. 6A and 6B is traveling in a central lane shown in the images. It is assumed that a vehicle enclosed by a dashed box in the image shown in FIG. 6A is the same as a vehicle enclosed by a dashed box in the image shown in FIG. 6B. The vehicle enclosed by the dashed box will be hereinafter referred to as "second vehicle" as appropriate.

It is assumed that the speed of the first vehicle is higher than the speed of the second vehicle. In this case, as shown in FIGS. 6A and 6B, the distance between the first vehicle and the second vehicle decreases along with an elapse of time. The lateral direction of the image captured by the on-board camera is assumed to be an x axis. The x coordinate of the center in the lateral direction of the image is assumed to be "x=0". As understood from FIGS. 6A and 6B, the value of the x coordinate of a central point CP of the dashed box increases along with the elapse of time. A temporal change in the x coordinate of the central point CP is shown in a graph of, for example, FIG. 7.

In FIGS. 6A and 6B, the second vehicle is present in a lane adjacent to the right side of the lane where the first vehicle is traveling. If a third vehicle traveling at a lower speed than that of the first vehicle is present in a lane adjacent to the left side of the lane where the first vehicle is traveling, the value of the x coordinate of the central point of a dashed box enclosing the third vehicle decreases along with the elapse of time.

For example, the image data traffic congestion detection unit 117 may perform the predetermined image processing on the image data acquired by the image data acquisition unit 116. For example, the image data traffic congestion detection unit 117 may determine a temporal change in the x coordinate of a point corresponding to the central point CP for each of the vehicles detected from the image data acquired by the image data acquisition unit 116. The image data traffic congestion detection unit 117 may detect, as a congested area, a road area where a predetermined number or more of vehicles in which the temporal change in the x coordinate of the point is a monotonic increase or a monotonic decrease are present within a third predetermined time (see, for example, FIG. 8).

Figure 8:
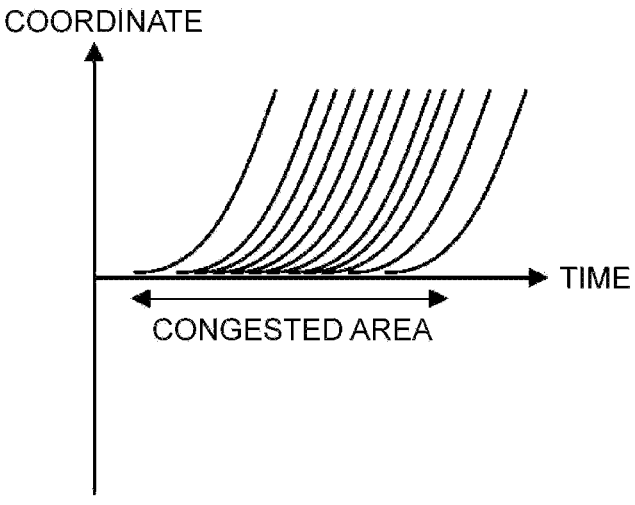
FIG. 8 shows an example of temporal changes in x coordinates of a plurality of vehicles shown in an image.

For example, the result of the image processing shown in FIG. 8 corresponds to an example of the second traffic congestion information described above. The image data traffic congestion detection unit 117 may calculate the confidence level (i.e., the confidence level related to the second traffic congestion information) based on the result of the image processing, etc. For example, the image data traffic congestion detection unit 117 may calculate the confidence level by using the mathematical expression "conf=w1×x1+w2×x2+w3×x3+ . . . +wn×xn" similarly to the traveling data traffic congestion detection unit 112. At least part of the parameters (e.g., x1, x2, x3, . . . , xn) may be different from the parameters used when the traveling data traffic congestion detection unit 112 calculates the confidence level. In a case where the image data traffic congestion detection unit 117 uses a learning model that outputs a traffic congestion detection result when image data is input, the confidence level output from the learning model may be used as the confidence level related to the second traffic congestion information.

When determination is made, in the process of step S108 of FIG. 4, to repeat the process from step S101 (step S108: Yes), for example, the traveling data traffic congestion detection unit 112 may adjust the parameters related to the Gaussian mixture model based on the result of the process of step S107. Specifically, when the number of lanes is detected in the process of step S107, the traveling data traffic congestion detection unit 112 may set the number of distributions serving as the parameter related to the Gaussian mixture model to be the same as the detected number of lanes.

Second Specific Example

Figure 9:
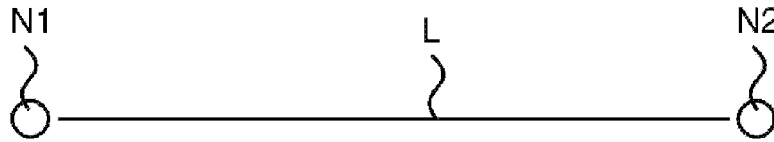
FIG. 9 shows an example of nodes and a link.

As a second specific example of the operation of the traffic congestion detection system 1, an operation of detecting the end of traffic congestion will be described with reference to FIGS. 9 to 11 in addition to the flowchart of FIG. 4. Regarding the second specific example, description that overlaps the description of the first specific example will be omitted as appropriate.

In the process of step S101 of FIG. 4, the traveling data acquisition unit 111 of the server device 10 may acquire pieces of traveling data related to a plurality of vehicles traveling on a predetermined road within a predetermined period from the storage device 12. For example, the predetermined road may be a road corresponding to a link L connecting nodes N1 and N2 (see FIG. 9) in a road map expressed by combinations of nodes and links.

In the process of step S102 of FIG. 4, the traveling data traffic congestion detection unit 112 may extract, for example, an area where the speed of each vehicle traveling from the node N2 toward the node N1 is equal to or lower than a threshold speed based on pieces of speed information in the pieces of traveling data acquired by the traveling data acquisition unit 111. The traveling data traffic congestion detection unit 112 may generate, for example, a time-distance diagram shown in FIG. 10 based on the extracted area.

Figure 10:
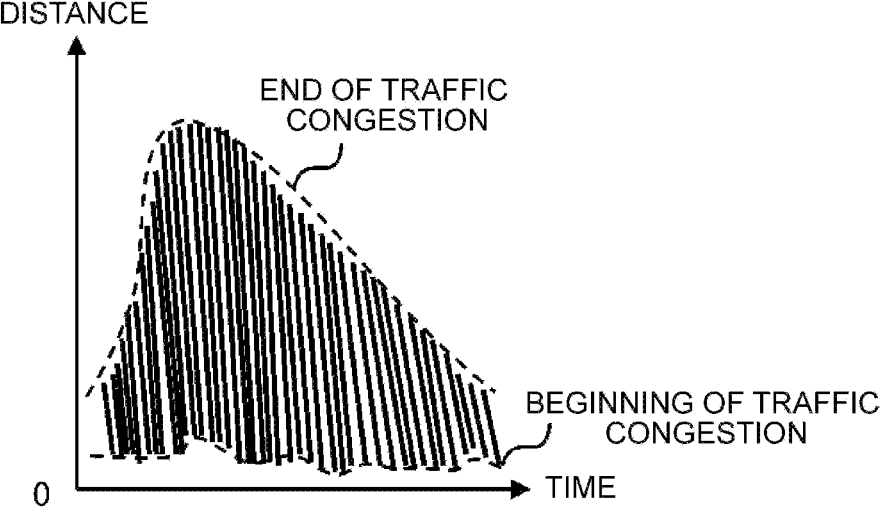
FIG. 10 shows an example of temporal changes in the positions of a plurality of vehicles traveling on a road corresponding to the link shown in FIG. 9.

In FIG. 10, the continuous line segments represent temporal changes in the positions of the vehicles. In FIG. 10, the distance is measured from the node N1, and the distance increases as the position is shifted away from the node N1 toward the node N2.

For example, the traveling data traffic congestion detection unit 112 may detect, as the beginning of traffic congestion, the end of each of the line segments in FIG. 10 on the side where the distance is smaller. The traveling data traffic congestion detection unit 112 may detect, as the end of traffic congestion, the end of each of the line segments in FIG. 10 on the side where the distance is larger. However, a sufficient number of vehicles that can communicate with the server device 10 are not always present on the predetermined road.

For this reason, the traveling data traffic congestion detection unit 112 may estimate the beginning and end of traffic congestion based on the time-distance diagram using, for example, a Kalman filter. The beginning and end of traffic congestion detected or estimated by the traveling data traffic congestion detection unit 112 correspond to another example of the first traffic congestion information described above.

The traveling data traffic congestion detection unit 112 may calculate the confidence level (i.e., the confidence level related to the first traffic congestion information) based on the result of the detection of the end of traffic congestion, etc. For example, the traveling data traffic congestion detection unit 112 may calculate the confidence level by using the mathematical expression "conf=$w1{\times}x1+w2{\times}x2+w3{\times}x3+\ldots+wn{\times}xn$". At least part of the parameters (e.g., $x1$, $x2$, $x3$, ..., $xn$) may be different from the parameters used when the traveling data traffic congestion detection unit 112 calculates the confidence level in the first specific example described above.

The inventors' research has revealed that, in the operation of detecting the end of traffic congestion, the confidence level tends to decrease, for example, in at least one of the cases where (1) the speed of the vehicle fluctuates around the threshold speed and the line segment is interrupted in the time-distance diagram, (2) a vehicle that cannot communicate with the server device 10 is present at the end of traffic congestion, (3) there is a period in which the vehicle that can communicate with the server device 10 is not present, and (4) the position of the end of traffic congestion varies depending on the lane and the variation in the position of the end of the line segment in the time-distance diagram is relatively large.

When determination is made, in the process of step S103 of FIG. 4, to use an image for traffic congestion detection (step S103: Yes), the processes of step S104 and subsequent steps are performed. In the process of step S104, the vehicle selection unit 114 may select one vehicle by a method described below with reference to FIG. 11. In FIG. 11, the continuous line segments represent temporal changes in the positions of the vehicles (including portions where the speeds of the vehicles are higher than the threshold speed described above). In FIG. 11, the distance is measured from the node N1, and the distance increases as the position is shifted away from the node N1 toward the node N2. In FIG. 11, a plurality of dots represents the positions of the vehicles (i.e., vehicles that can communicate with the server device 10) at time t3.

Figure 11:
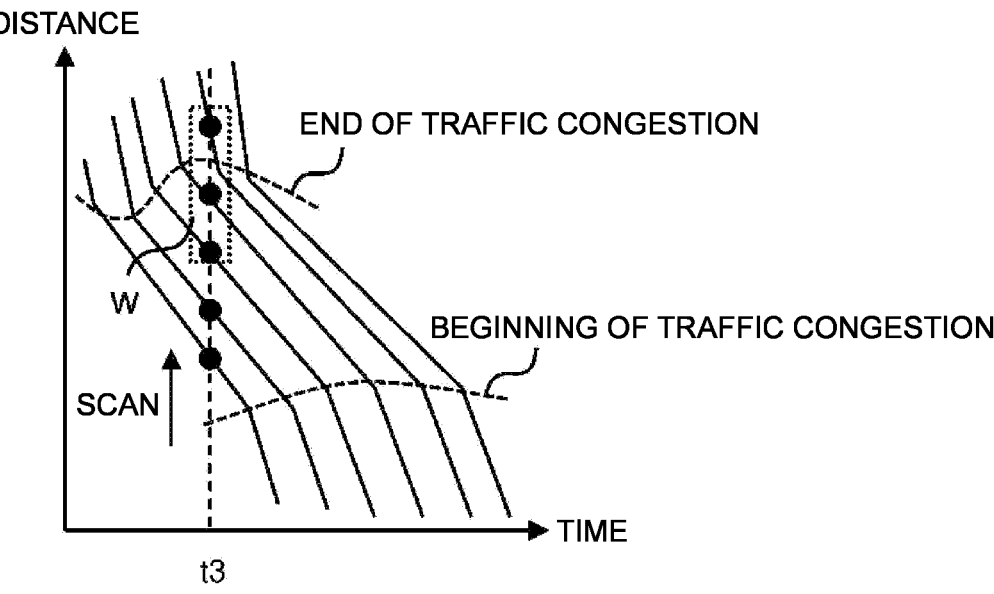
FIG. 11 is a conceptual diagram illustrating an example of a vehicle selection method.

For example, in the time-distance diagram shown in FIG. 11, the vehicle selection unit 114 may calculate an average speed and variance of two or more vehicles included in a window W while changing the position of the window W along the direction of the distance axis (i.e., the vertical axis) (see "scan" in FIG. 11). When the window W includes only two or more vehicles traveling in a congested area, the calculated average speed is relatively low (e.g., equal to or lower than the threshold speed described above) and the variance is relatively small. When the window W includes one or more vehicles traveling in a congested area and one or more vehicles traveling in a non-congested area, the calculated average speed is relatively high and the variance is relatively large.

The vehicle selection unit 114 may determine a position of the window W where the calculated average speed and variance of two or more vehicles included in the window W are equal to or higher than an average speed threshold and a variance threshold, respectively. The vehicle selection unit

114 may select one vehicle (i.e., a vehicle serving as the provider of an image) based on the determined position of the window W.

In the process of step S105 of FIG. 4, the image specification change unit 115 adjusts (or changes) the specifications of the image to be used for traffic congestion detection based on the confidence level calculated by the traveling data traffic congestion detection unit 112 (i.e., the confidence level related to the first traffic congestion information). The image specification change unit 115 may adjust the image specifications by using the mathematical expression "$1=\max(\sigma(\mathrm{conf}){\times}1\_\mathrm{max}, 1\_\mathrm{min})$" as in the first specific example described above.

In the process of step S107 of FIG. 4, the image data traffic congestion detection unit 117 detects traffic congestion by using at least part of the image data acquired by the image data acquisition unit 116. As in the first specific example described above, the image data traffic congestion detection unit 117 may detect the congested area based on a temporal change in the x coordinate (see FIGS. 7 and 8) of the central point (see FIGS. 6A and 6B) of the dashed box enclosing a vehicle shown in the image. The image data traffic congestion detection unit 117 may detect the end of traffic congestion based on the detected congested area.

When determination is made, in the process of step S108 of FIG. 4, to repeat the process from step S101 (step S108: Yes), for example, the traveling data traffic congestion detection unit 112 may adjust the parameters related to the process of detecting the end of traffic congestion based on the result of the process of step S107. For example, in a case where the end of traffic congestion is detected by applying density-based spatial clustering of applications with noise (DBSCAN) to each line segment in the time-distance diagram shown in FIG. 10, the traveling data traffic congestion detection unit 112 may adjust a data point radius of DBSCAN based on the result of the process of step S107.

Technical Effects

In the traffic congestion detection system 1 according to the first embodiment, the vehicle selection unit 114 selects a vehicle serving as the provider of an image (e.g., a surrounding image) to be used for traffic congestion detection. Then, the image data traffic congestion detection unit 117 detects traffic congestion by using the image acquired from the vehicle selected by the vehicle selection unit 114. That is, in the traffic congestion detection system 1 according to the first embodiment, the image data traffic congestion detection unit 117 processes only the image acquired from the vehicle selected by the vehicle selection unit 114. With the traffic congestion detection system 1 according to the first embodiment, analysis cost related to image analysis for traffic congestion detection can be reduced.

In the traffic congestion detection system 1 according to the first embodiment, the image specification change unit 115 changes the specifications of the image based on the confidence level related to the first traffic congestion information. For example, the image specification change unit 115 may reduce the resolution of an image in a case where the confidence level related to the first traffic congestion information is lower than but close to the first threshold compared to the resolution of an image in a case where the confidence level related to the first traffic congestion information is significantly lower than the first threshold. With this configuration, it is possible to improve the reliability of traffic congestion detection while reducing the analysis cost related to image analysis for traffic congestion detection.

In the first embodiment, each of the vehicles including the vehicle 20 may transmit the surrounding image to the server device 10 only when a predetermined event has occurred (e.g., the speed is lower than a predetermined speed or a hazard indicator is ON). With this configuration, communication cost related to transmission and reception of images to be used for traffic congestion detection can be reduced.

Second Embodiment

A second embodiment related to the traffic congestion detection system will be described. The configuration and operation in the second embodiment may be the same as the configuration and operation in the first embodiment described above, except that the operation of the traffic congestion detection system 1 is partially different. Regarding the second embodiment, description that overlaps the description of the first embodiment will be omitted as appropriate.

In the second embodiment, each of the vehicles including the vehicle 20 may transmit a surrounding image to the server device 10 when a request to transmit a surrounding image is received from the server device 10. For example, when the request to transmit a surrounding image is received from the server device 10 via the communication device 24, the ECU 21 of the vehicle 20 may transmit a surrounding image showing the surroundings of the vehicle 20 and captured by the on-board camera 22 to the server device 10 via the communication device 24.

An operation of the server device 10 according to the second embodiment will be described with reference to the flowchart of FIG. 4. When determination is made, in the process of step S103 of FIG. 4, to use an image for traffic congestion detection (step S103: Yes), the vehicle selection unit 114 selects a vehicle serving as a provider of an image (e.g., a surrounding image) to be used for traffic congestion detection (step S104). The image specification change unit 115 adjusts (or changes) the specifications of the image to be used for traffic congestion detection based on the confidence level related to the first traffic congestion information (step S105).

After the processes of steps S104 and S105, the computation device 11 of the server device 10 may transmit a transmission request for requesting transmission of a surrounding image(s) with the image specifications adjusted by the image specification change unit 115 to the one or more vehicles selected by the vehicle selection unit 114 via the communication device 13.

The vehicle that has received the transmission request from the server device 10 (i.e., the vehicle selected by the vehicle selection unit 114) transmits the surrounding image with the image specifications adjusted by the image specification change unit 115 to the server device 10. The server device 10 may temporarily store the surrounding image transmitted from the vehicle in the storage device 12.

In the process of step S106 of FIG. 4, the image data acquisition unit 116 acquires image data (i.e., the surrounding image transmitted from the vehicle) from the storage device 12.

Technical Effects

With the traffic congestion detection system 1 according to the second embodiment, it is possible to improve the reliability of traffic congestion detection while reducing the analysis cost related to image analysis for traffic congestion detection as in the first embodiment described above. In the traffic congestion detection system 1 according to the second embodiment, as described above, the vehicle (e.g., the vehicle 20) transmits the surrounding image to the server device 10 when the transmission request is received from the server device 10. With the traffic congestion detection system 1 according to the second embodiment, the communication cost related to transmission and reception of images to be used for traffic congestion detection can be reduced.

Third Embodiment

A third embodiment related to the traffic congestion detection system will be described. The configuration and operation in the third embodiment may be the same as the configuration and operation in the first embodiment described above, except that the operation of the traffic congestion detection system 1 is partially different. Regarding the third embodiment, description that overlaps the description of the first embodiment will be omitted as appropriate.

In the third embodiment, each of the vehicles including the vehicle 20 has functions corresponding to the image data acquisition unit 116 and the image data traffic congestion detection unit 117 in the first embodiment described above. For example, the ECU 21 of the vehicle 20 may have the functions corresponding to the image data acquisition unit 116 and the image data traffic congestion detection unit 117 in the first embodiment described above. Therefore, the computation device 11 of the server device 10 according to the third embodiment need not include the image data acquisition unit 116 and the image data traffic congestion detection unit 117.

An operation of the traffic congestion detection system 1 according to the third embodiment will be described with reference to the flowchart of FIG. 4. When determination is made, in the process of step S103 of FIG. 4, to use an image for traffic congestion detection (step S103: Yes), the vehicle selection unit 114 selects a vehicle serving as a provider of an image (e.g., a surrounding image) to be used for traffic congestion detection (step S104). The image specification change unit 115 adjusts (or changes) the specifications of the image to be used for traffic congestion detection based on the confidence level related to the first traffic congestion information (step S105).

After the processes of steps S104 and S105, the computation device 11 of the server device 10 may transmit image specification information indicating the image specifications adjusted by the image specification change unit 115 to the one or more vehicles selected by the vehicle selection unit 114 via the communication device 13.

In the process of step S106 of FIG. 4, the vehicle that has received the image specification information from the server device 10 (i.e., the vehicle selected by the vehicle selection unit 114) acquires the surrounding image (i.e., image data) captured by the on-board camera of the vehicle with the image specifications indicated by the image specification information. For example, when the vehicle that has received the image specification information is the vehicle 20, the ECU 21 may acquire the surrounding image captured by the on-board camera 22 with the image specifications indicated by the image specification information.

In the process of step S107 of FIG. 4, the vehicle that has received the image specification information from the server device 10 detects traffic congestion by using at least part of the surrounding image (i.e., image data) acquired in the process of step S106. The vehicle generates second traffic congestion information on the detected traffic congestion.

For example, when the vehicle that has received the image specification information is the vehicle 20, the ECU 21 may detect traffic congestion by using at least part of the surrounding image acquired in the process of step S106. The ECU 21 may generate second traffic congestion information on the detected traffic congestion.

After the process of step S107, the vehicle transmits the second traffic congestion information to the server device 10. In this case, the vehicle may transmit, in addition to the second traffic congestion information, information indicating the confidence level related to the second traffic congestion information to the server device 10.

Technical Effects

With the traffic congestion detection system 1 according to the third embodiment, it is possible to improve the reliability of traffic congestion detection while reducing the analysis cost related to image analysis for traffic congestion detection as in the first embodiment described above. In the traffic congestion detection system 1 according to the third embodiment, as described above, the vehicle (e.g., the vehicle 20) generates the second traffic congestion information. In the traffic congestion detection system 1 according to the third embodiment, there is no need to transmit the image to be used for traffic congestion detection from the vehicle (e.g., the vehicle 20) to the server device 10. With the traffic congestion detection system 1 according to the third embodiment, the communication cost related to transmission and reception of images to be used for traffic congestion detection can be reduced.

Various aspects of the disclosure derived from the embodiments described above will be described below.

A traffic congestion detection system according to an aspect of the disclosure includes: a traveling data acquisition unit configured to acquire pieces of traveling data from a plurality of vehicles; a first detection unit configured to generate first traffic congestion detection information based on at least part of the acquired pieces of traveling data; an image acquisition unit configured to acquire image information on a surrounding image for at least one vehicle out of the plurality of vehicles; a determination unit configured to determine whether to use the image information for traffic congestion detection based on a confidence level related to the first traffic congestion detection information; a second detection unit configured to, when the determination unit determines to use the image information for the traffic congestion detection, generate second traffic congestion detection information by using the image information acquired by the image acquisition unit; and a generation unit configured to generate third traffic congestion detection information based on the second traffic congestion detection information.

In the embodiments described above, the "traveling data acquisition unit 111" corresponds to an example of the "traveling data acquisition unit", the "traveling data traffic congestion detection unit 112" corresponds to an example of the "first detection unit", the "image data acquisition unit 116" corresponds to an example of the "image acquisition unit", the "determination unit 113" corresponds to an example of the "determination unit", the "image data traffic congestion detection unit 117" corresponds to an example of the "second detection unit", the "traffic congestion information integration unit 118" corresponds to an example of the "generation unit", and the "ECU 21" corresponds to another example of the "image acquisition unit" and the "second detection unit".

In the traffic congestion detection system, the second detection unit may be configured to generate the second traffic congestion detection information by using image information with image specifications changed based on the confidence level related to the first traffic congestion detection information.

In the traffic congestion detection system, the second detection unit may be configured to generate the second traffic congestion detection information by using image information selected based on the confidence level related to the first traffic congestion detection information.

In the traffic congestion detection system, the generation unit may be configured to generate the third traffic congestion detection information based on the first traffic congestion detection information and the second traffic congestion detection information.

In the traffic congestion detection system, the image acquisition unit may be configured to acquire the image information on the surrounding image for the at least one vehicle when the determination unit determines to use the image information for the traffic congestion detection.

The traffic congestion detection system may include a change unit configured to change image specifications related to the image information based on the confidence level related to the first traffic congestion detection information, and the image acquisition unit may be configured to acquire the image information on the surrounding image for the at least one vehicle with the image specifications changed by the change unit. In the embodiments described above, the "image specification change unit 115" corresponds to an example of the "change unit".

The traffic congestion detection system may include a selection unit configured to select at least one vehicle from among the plurality of vehicles based on the confidence level related to the first traffic congestion detection information, and the image acquisition unit may be configured to acquire image information on a surrounding image for the at least one vehicle selected by the selection unit. In the embodiments described above, the "vehicle selection unit 114" corresponds to an example of the "selection unit".

The present disclosure is not limited to the above embodiments, and can be modified as appropriate without departing from the gist and spirit of the disclosure that can be read from the claims and the entire specification, and a traffic congestion detection system including such modifications is also included in the technical scope of the present disclosure.

What is claimed is:

1. A traffic congestion detection system comprising a server device, the server device includes at least one processor, the at least one processor being configured to perform commands comprising:

acquiring pieces of traveling data from a plurality of vehicles;

generating first traffic congestion detection information based on at least part of the acquired pieces of traveling data;

acquiring image information on a surrounding image for at least one vehicle out of the plurality of vehicles;

determining whether to use the image information for traffic congestion detection based on a confidence level related to the first traffic congestion detection information;

reducing a resolution of the surrounding image in a case where the confidence level is lower than a first threshold confidence level but within a first range of confidence levels from the first threshold confidence level as compared to a resolution of the surrounding image in a case where the confidence level is lower than the first threshold confidence level by a greater amount than the first range of confidence levels;

generating second traffic congestion detection information by using the acquired image information with the reduced resolution when determining the image information is to be used for the traffic congestion detection; and generating third traffic congestion detection information based on the second traffic congestion detection information.

2. The traffic congestion detection system according to claim 1, wherein the at least one processor is further configured to perform commands, including generating the second traffic congestion detection information by using image information with image specifications changed based on the confidence level related to the first traffic congestion detection information.

3. The traffic congestion detection system according to claim 1, wherein the at least one processor is further configured to perform commands, including generating the second traffic congestion detection information by using image information selected based on the confidence level related to the first traffic congestion detection information.

4. The traffic congestion detection system according to claim 1, wherein the at least one processor is further configured to perform commands, including generating the third traffic congestion detection information based on the first traffic congestion detection information and the second traffic congestion detection information.

5. The traffic congestion detection system according to claim 4, wherein the server device further includes a communication unit configured to distribute traffic congestion information based on the third traffic congestion detection information to a plurality of vehicles.

6. The traffic congestion detection system according to claim 1, wherein the at least one processor is further configured to perform commands, including acquiring the image information on the surrounding image for the at least one vehicle when determining to use the image information for the traffic congestion detection.

7. The traffic congestion detection system according to claim 1, wherein the at least one processor is further configured to perform commands, including:

changing image specifications related to the image information based on the confidence level related to the first traffic congestion detection information; and acquiring the image information on the surrounding image for the at least one vehicle with the image specifications changed.

8. The traffic congestion detection system according to claim 1, wherein the at least one processor is further configured to perform commands, including:

selecting at least one vehicle from among the plurality of vehicles based on the confidence level related to the first traffic congestion detection information; and acquiring image information on a surrounding image for the at least one vehicle selected.

* * * * *